Sept. 18, 1934.                C. E. PRICE                 1,973,778
                        APPARATUS FOR COATING CONFECTIONS
                 Original Filed Sept. 13, 1930      3 Sheets-Sheet 1

INVENTOR:
CLAUDE E. PRICE
BY: Cheever, Cox & Moore
                ATTY'S.

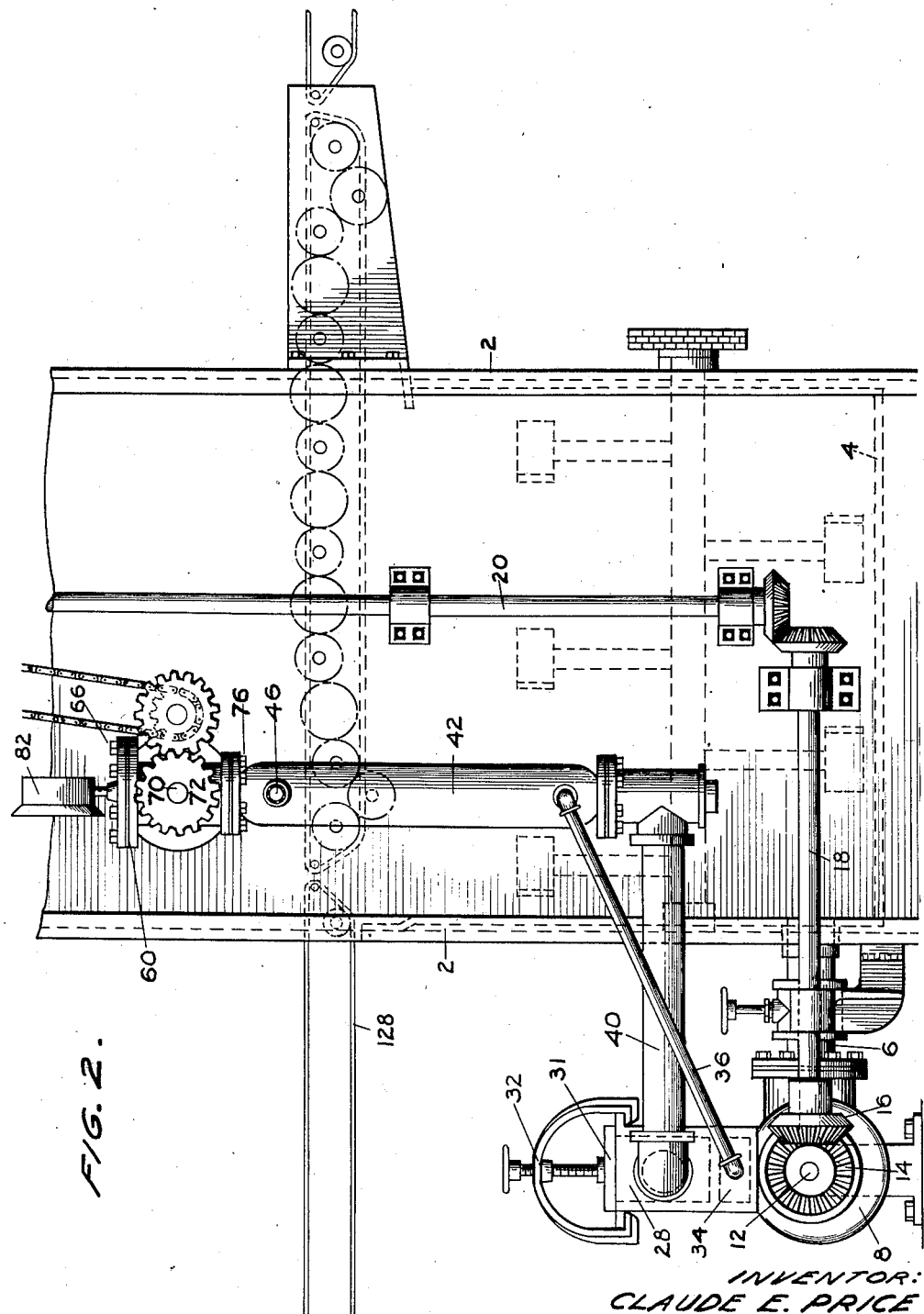

Sept. 18, 1934.　　　　　C. E. PRICE　　　　　1,973,778
APPARATUS FOR COATING CONFECTIONS
Original Filed Sept. 13, 1930　　3 Sheets-Sheet 3
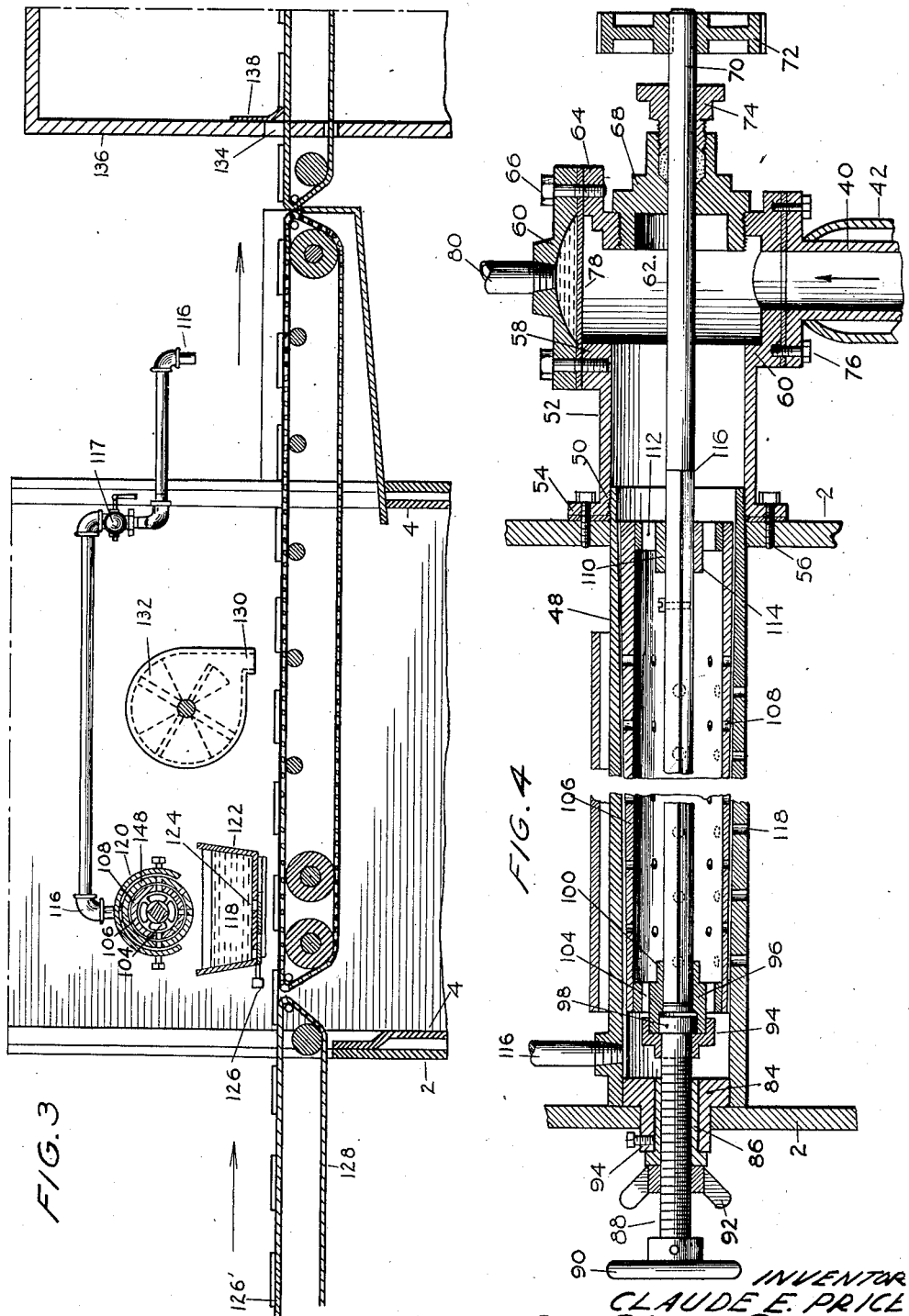
INVENTOR
CLAUDE E. PRICE
BY Cheever, Cox & Moore
ATTY'S.

Patented Sept. 18, 1934

1,973,778

UNITED STATES PATENT OFFICE 1,973,778

APPARATUS FOR COATING CONFECTIONS

Claude E. Price, Chicago, Ill., assignor to Bunte Brothers, Chicago, Ill., a corporation of Illinois Original application September 13, 1930, Serial No. 481,740. Divided and this application July 25, 1931, Serial No. 553,128

7 Claims. (Cl. 99—2)

My present invention relates to an apparatus for coating confections as with a chocolate or cocoa-containing mixture, the same comprising a division of my co-pending application, Serial Number 481,740, filed September 13, 1930, for apparatus for and method of coating confections.

One of the important objects of my present invention is to provide an apparatus for coating confections with chocolate so that the coating shall have a uniform, pleasing and glossy chocolate finish.

Another object is to provide an apparatus for applying a mixture of cocoa butter, cocoa powder and sugar or the equivalent coating preparation to confections in such a manner that the coating will adhere in a uniform and consistent manner and will not disintegrate.

Yet another object of my invention resides in the particular means for homogenizing the chocolate-containing mixture for the confection, and particularly in the means by which it is applied to the confection as the confection is fed through the apparatus.

Referring to the drawings:

Figure 2 is a view at right angles thereto;

Figure 3 is a somewhat diagrammatic view of the confection conveying means and the homogenizing apparatus, the latter being shown in cross-section; and Figure 4 is a detailed sectional view of the homogenizing apparatus.

Figure 1:
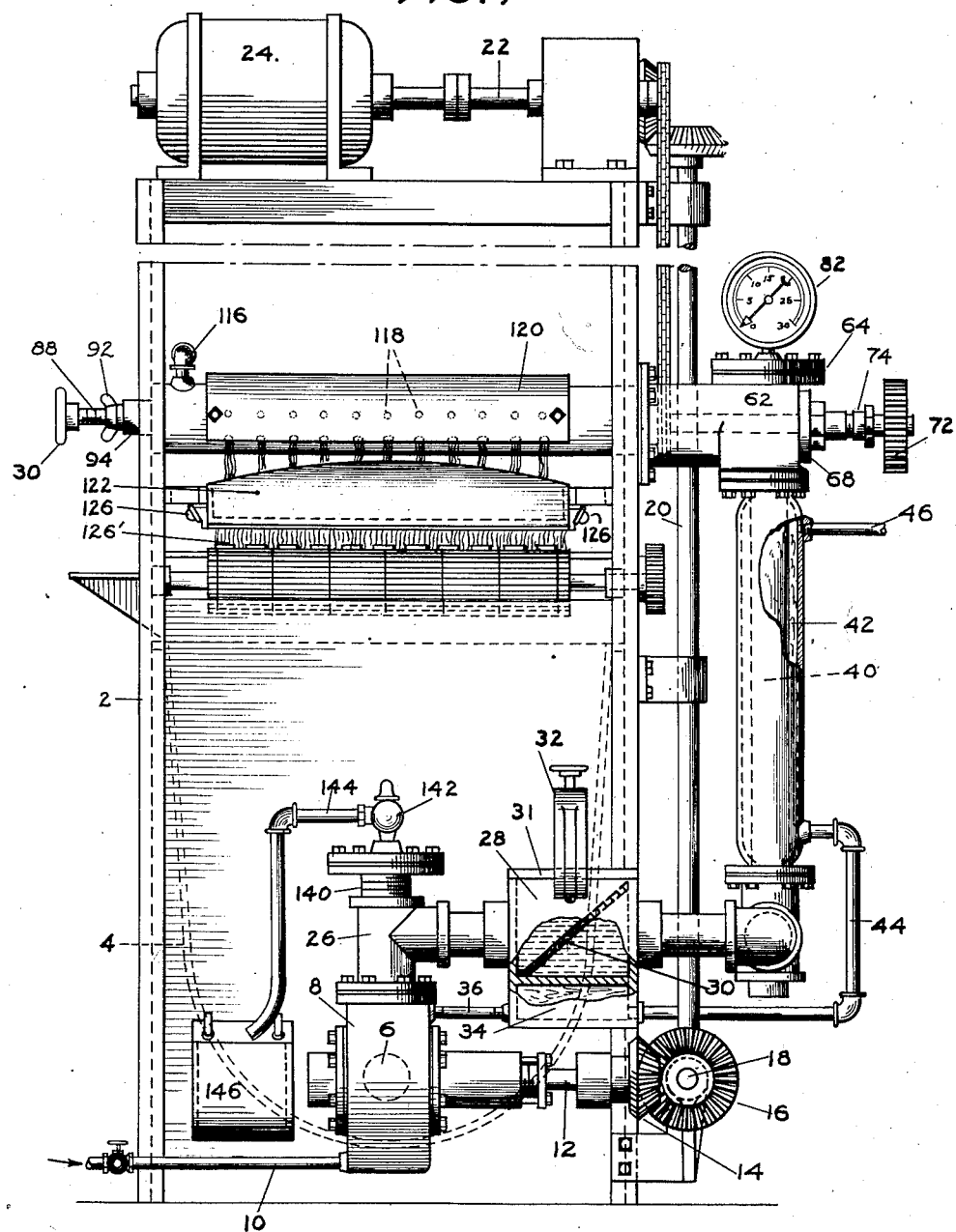
Figure 1 is a side view of one form of my apparatus for carrying out my improved method.

In coating confections, it is customary to use a mixture of cocoa butter, cocoa powder and sugar as the coating medium. In case milk chocolate coating is desired, milk powder is an additional ingredient.

Heretofore, in coating confections with this chocolate or cocoa containing coating medium, much difficulty has been experienced because of the tendency of the cocoa powder or equivalent to part or disintegrate from the cocoa butter ingredient of the coating after application to the confection. This disintegration or powdering away of the cocoa, chocolate or equivalent ingredient from the cocoa butter has resulted in an inferior finish and rendered the confection more or less unsalable. In the present invention, I have provided an apparatus and accompanying method whereby the coating is applied to the confection in a manner such that the cocoa powder or equivalent does not disintegrate from the cocoa butter when applied to the confection, so that the chocolate covered confection is given and maintains a glossy chocolate finish which is highly pleasing to the eye.

I have discovered that, by homogenizing the coating mixture immediately before applying it as a covering to the confection and then immediately cooling the coated confection, the objectionable tendency of the cocoa powder to disintegrate from the coating is eliminated, and that the chocolate coating has a glossy and pleasing chocolate finish. In actual practice the temperature of the coating mixture is preferably maintained substantially around 90 degrees or 92 degrees Fahrenheit, and is homogenized at a pressure of approximately fifteen (15) pounds. I also found that the pressure should not rise above fifty (50) pounds during the homogenizing operation.

To illustrate my invention, I have shown on the drawings, purely by way of explanation and not by way of limitation, preferred apparatus comprising a standard 2 of any suitable form or construction carrying a vat 4 for the coating mixture. At the bottom the vat communicates with an exit pipe 6, in turn communicating with a power driven pump 8 for forcing the mixture as hereinafter explained. This pump is suitably jacketed and is kept heated by a hot water or steam pipe 10. The pump 8 is driven from a shaft 12 terminating in a bevel gear 14 geared to another bevel gear 16 on a shaft 18 geared to a vertical shaft 20, in turn geared to a horizontal shaft 22 driven by the motor 24 on the top of the standard 2. The exit pipe 26 from the pump 8 empties into a box or container 28 in which is diagonally disposed a wire mesh screen or foraminated plate 30, which is of sufficiently fine mesh to screen out any hard lumps or other foreign matter, and acts to impart a fine and uniform consistency to the mixture. This chamber 28 is provided with a cover 31 held in place by means of a suitable clamp 32. In addition, the container 28 is preferably provided with a heating jacket in order to keep the mixture in a fluid or semi-fluid state. This heating chamber 34 is connected to the exit pipe 36 from the heating chamber of the pump 8. The box or container 28 discharges into a substantially vertical pipe 40 leading to the homogenizer hereinafter described. This pipe 40 is also jacketed as at 42, and a pipe 44 connects with the exit of the heating jacket 34 to the inlet of the heating jacket 42, so that the heating medium flows continuously about the pump 8, the box 28, and the pipe 40, the heating medium discharging from the pipe 42 at pipe 46. In this manner, the mixture is maintained in a heated, fluid state in its passage from the vat 4 to the homogenizer.

In order to break up the cocoa butter globules and thoroughly to admix them with the cocoa powder and sugar and powdered milk, in case the latter is used, I provide a simple and novel type of homogenizer for satisfactorily carrying out this operation, and this homogenizer is constructed and arranged to co-operate with a feeding means adapted continuously to carry a succession of confection pieces through the apparatus and preferably to the cooling device. To this end the spaced apart upright supports of the frame 2 are provided with registering apertures, one of said apertures being larger than the other and being adapted to support a tapered horizontally disposed cylinder 48. One end of this cylinder, as at 50, is provided with screw threads to screw into a short cylindrical pipe 52, having a flange 54 bolted as at 56 to the upright 2. The opposite end of this pipe 52 is provided with a flange 58 to which is bolted a sleeve 60 of larger diameter, and providing internally thereof a chamber 62. This sleeve 60 is provided at its end with a closure 64 bolted thereto as at 66, and this closure 64 is internally threaded to receive a closing cap 68, centrally apertured to provide a bearing for a shaft 70, turnable by means of a wheel 72 fixed to the end thereof. A suitable stuffing box 74 surrounds the shaft 70 and screws into the end of the cap 68, and comprises a suitable packing so as to prevent the escape of the mixture at the opening surrounding the shaft 70. At right angles to the cap 64 closing the end of the sleeve 60, the sleeve 60 is provided with another opening at which the upper portion of the pipe 40 is bolted as at 76. By means of this construction, the coating mixture which passes through the upright pipe 40 will pass into the chamber 62 and thence through the sleeve 52. At the top, the cap 60 is provided with a pressure diaphragm 78 connecting with the pipe 80 leading to a suitable pressure gauge 82 for instantly indicating the pressure to which the mixture is being subjected during the homogenizing operation.

The opposite end of the homogenizing sleeve 48 is formed with an internally flanged centralizing collar 84, the smaller flange of which passes through the opening in the upright tube, the larger flange fitting snugly within the open end of the cylinder 48. This collar 84 is bolted to receive a sleeve 86 of cylindrical T-shaped construction and a threaded eye 88 adjustably threads through the collar 86. The outer end of this rod 88 is provided with a turning wheel 90 and a lock nut 92 threadedly engages on the rod 88 and abuts against the outer end of the inner sleeve 86, so as to hold the rod 88 in any adjusted position. The inner end thereof carries a cap 94 having an internal thread engaging the threads of a hub 96. The cap 94 is apertured so that the inner unthreaded end of the rod 88 freely passes therethrough. The extremity of this unthreaded end is provided with a head 98, which slidingly fits within a bore formed axially of the hub 96. This bore is provided with a shoulder at one side against which the head 98 is adapted to abut; and the cap 94 provides an opposite formed shoulder against which the head 98 is adapted to abut. By this means when the hand wheel 90 is turned, the head 98 on the end thereof will abut either one shoulder or the other to cause the hub 96 to be moved either to the right or to the left. At the same time this connection will not interfere with the continuous rotation of the hub 96 as hereinafter explained.

This hub is provided with a central, splined opening 100 and an angular or square shaped shaft 102 fits within the spline. In addition the hub 96 is provided with a series of openings 104 for the passage of the mixture therethrough. The hub is rigidly fastened to the inner end wall of a second sleeve 106. This sleeve 106 is reversely tapered with respect to the tapered sleeve 48. The sleeve 106 is provided preferably with a plurality of spaced apart openings 108, through which the mixture is adapted to be squeezed. The opposite end of this tapered sleeve 106 is internally provided with an additional hub 110 having apertures 112 and a central annular flange 114, which is apertured to receive the square shaft 102 which snugly fits therewithin. Beginning at the point 116, the square shaft 102 is rounded towards its outer end and passes as hereinbefore described through the stuffing box 74. By means of the hereinbefore described construction, when the wheel 72 is continuously turned by any desired source of power, the shaft 102 is rotated and the tapered sleeve 106 is likewise rotated within the stationary tapered sleeve 48.

The end of the tapered sleeve 48 nearest to the hand wheel 90 is provided with a pipe 116 communicating with the interior of the sleeve. This pipe has its terminus extending to a point which overlies the moving pieces of confection, and a valve 117 is arranged so that the passage of the homogenized mixture through this passage 116 may be cut off if desired. This passage 116 is so arranged that a portion of the homogenized mixture may be added to any piece of confection as it passes along the feeding means. In this manner, if a piece of confection has not been satisfactorily covered, or if sufficient coating is not provided for any particular piece of confection, additional coating may be obtained by turning the cock 117 and securing sufficient of such coating to apply manually to the piece of confection prior to its entering into the cooling chamber. The cylinder 48 is provided particularly at its bottom and along a portion of its lower side walls with a plurality of spaced apart openings or apertures 118 through which the mixture is adapted to be squeezed in the homogenizing operation. In order to prevent the mixture from spurting laterally through these openings, a covering or plate 120 surrounds the uppermost of these apertures.

Directly beneath this homogenizer and extending throughout its length is arranged a container or tray 122 having a plurality of openings 124 at its bottom, which are normally covered by a manually operated slide 126, the construction being arranged so that upon suitable manipulation of the slide to register the openings in the bottom end of the slide, the homogenizing mixture which falls into the container 122 from the homogenizer will pass through these openings and will fall upon the pieces of confection 126' which are carried by the conveying apparatus 128 in continuous spaced apart succession through the apparatus and beneath the nozzle 130 of the drier 132, and thence through an opening 134 in the cooling apparatus 136. A suitable one way valve or gate 138 permits the passage of the confection into the cooling chamber while preventing the escape of the cool air therefrom. A succession of endless belt-treating mechanisms are arranged with respect to the framework 2 of the apparatus so as to pass the pieces of confection in a continuous manner through the machine under the homogenizer, the drier, and thence into the cooling apparatus.

In the operation of my improved device and in the carrying out of my method, a succession of confections of desired nature such as pieces of candy are fed on to the conveying means 128 and as they pass beneath the tray 122 which has been filled with homogenized chocolate coating, the slide 126 is operated to deposit a predetermined amount of coating on the piece of confection. From this point the coated confection will then pass beneath the drier 132 and will then pass into the cooling chamber.

In the operation of the homogenizer the mixture of cocoa butter, cocoa powder and sugar passes from the vat 2 into the pump 8, where it is forced through the pipe 26 and through the box 28 and screen 30 up through the jacketed pipe 40 and into the homogenizing chamber 62 at a pressure of from 15 to not more than 50 pounds and at a temperature preferably from 90° to 92° Fahrenheit. During this time, the wheel 72 is driven from any source of power so as to continuously rotate the inner tapered sleeve 106. As the chocolate mixture is forced under pressure through the sleeve 52 and through the openings 112 in the hub 110 into the central portion of the apertured rotating sleeve 106, such pressure will at once force the mixture through the apertures in said sleeve, and since the space between the inner walls of the stationary sleeve 48 and the outer wall of the rotating sleeve 106 is very small, the mixture will be cut off in a number of very small streams. In this manner an effective homogenization of the mixture is accomplished. From the inner sleeve 106 the homogenized mixture passes through the openings 118 into the pan 122 and thence is applied to the confection.

The inner tapered sleeve 106 is adjusted endwise without interfering with its continuous rotation, by means of the threaded rod 88 and the head 98 engaging the cooler 94, which screwthreadedly engages the thread of the hub 96 situated at the end of the rotating inner tapered sleeve. By turning the hand wheel 90 in one direction, the head 98 will abut against the shoulder of the collar 4 and pull the sleeve toward the left. When the hand wheel is rotated in the opposite direction the head 98 will abut against the inner shoulder of the bore of the hub 96 and push the sleeve 106 to the right. This adjustment does not interfere with the proper rotation of the sleeve 106 by means of the gear 72.

In some instances I provide for the escape of the mixture when the pressure within the homogenizing apparatus becomes too great for the pump 8. To accomplish this, the L-shaped pipe 26 connecting the pump 8 with the screen containing box 28 is provided with a pipe 140 carrying a preferably gravity operated escape valve 142 controlling the exit of the material through a pipe 144 back to a container 146 in turn emptying into the vat 4, it being understood that when the pressure within the homogenizing valve builds up to such an extent that the pump cannot thereafter force the mixture against such built-up pressure, then the mixture will pass through the valve 142, through the pipe 144, and back into the vat. The indicator 82 at all times indicates the pressure built up within the homogenizing valve.

In the use of the term "cocoa powder" in the foregoing, it will be understood that I am to include any equivalent thereof such as chocolate and the like.

It is thought that the invention and numerous of its attendant advantages will be understood from the foregoing description and it is obvious that numerous changes may be made in the form, construction, and arrangement of the several parts without departing from the spirit or scope of my invention or sacrificing any of its attendant advantages; the form herein described being a preferred embodiment for the purpose of illustrating my invention.

Having thus described my invention, what I claim as new and desire to secure by Letters Patent, is as follows:

1. In a device for homogenizing ingredients to form an emulsified candy coating, the combination with a stationary sleeve having a plurality of openings and having a predetermined taper, of a second sleeve mounted in the first sleeve and having a plurality of spaced apart openings therethrough, means for rotating said inner sleeve, means for moving said inner sleeve longitudinally with respect to the outer sleeve to adjust the space therebetween, whereby to regulate the homogenizing action and means for forcing a mixture under pressure through the inner sleeve.

2. In a device of the class described, the combination of spaced apart supports having registering apertures, a tapered sleeve extending through the aperture of one of said supports and having its central axis registering with the axis of the other aperture, a bearing block passing through the other aperture and mounted within the end of said sleeve, a reversely tapered sleeve mounted within the first mentioned sleeve, said first mentioned sleeve having a series of apertures and said inner sleeve having a plurality of peripherally located apertures, a central shaft passing through said inner sleeve and having a splined connection therewith to permit the endwise movement of said sleeve with respect to said shaft, means for turning said sleeve, and a threaded rod having a head freely turnable with respect to said sleeve, said head being constructed and arranged to abut portions of said sleeve when they are moved in reverse directions, whereby upon an angular movement of said rod, said sleeve will be moved in a corresponding direction to adjust said sleeve with respect to the outer stationary sleeve.

3. In a device for homogenizing ingredients to form an emulsified candy coating, the combination with spaced apart supports having registered apertures, of a tapered sleeve extending through the aperture of one of said supports and having its central axis registering with the axis of the other aperture, a bearing block passing through the other aperture and mounted within the end of said sleeve, a reversely tapered sleeve mounted within the first mentioned sleeve, said first mentioned sleeve having a series of apertures and said inner sleeve having a plurality of peripherally located apertures, a central shaft passing through said inner sleeve and having a splined connection therewith to permit the endwise movement of said sleeve with respect to said shaft, means for turning said sleeve, and a threaded rod having a head freely turnable with respect to said sleeve, said head being constructed and arranged to abut portions of said sleeve when they are moved in reverse directions whereby, upon an angular movement of said rod, said sleeve will be moved in a corresponding direction to adjust said sleeve with respect to the outer stationary sleeve, and means for feeding the ingredients to be homogenized to the homogenizer under appreciable pressure.

4. In a device for treating ingredients to be used in coating confections, the combination with means forming a vat for receiving the ingredients to be treated, of a homogenizer comprising a stationary casing formed with a plurality of apertures, and a homogenizing sleeve within said casing, said sleeve having a plurality of peripheral apertures, means for rotating said sleeve within said casing, and means for pumping a coating mixture from the vat to the homogenizer under pressure, said casing and sleeve being tapered, means for adjusting the tapered sleeve longitudinally within the tapered casing, and means to heat the ingredients before they are delivered to the homogenizer under pressure.

5. In a device for treating ingredients to be used in coating confections, the combination with means forming a vat for receiving the ingredients to be treated, of a homogenizer comprising a stationary casing formed with a plurality of apertures, and a homogenizing sleeve within said casing, said sleeve having a plurality of peripheral apertures, means for rotating said sleeve within said casing, means for pumping a coating mixture from the vat to the homogenizer under pressure, said casing and sleeve being tapered, and means for adjusting the tapered sleeve longitudinally within the tapered casing.

6. In a device for homogenizing ingredients to form an emulsified candy coating, the combination of a pair of concentric sleeves mounted one within the other and having each a plurality of openings therethrough, at least one of said sleeves having a predetermined taper, means for relatively rotating said sleeves, means for moving one of said sleeves longitudinally with respect to the other sleeve to adjust the space therebetween in order to regulate the homogenizing action, and means to force a mixture to be homogenized under pressure through said sleeves.

7. In a device for treating ingredients for use in coating confections, the combination with means forming a vat for receiving the ingredients to be treated, of a homogenizer comprising a pair of concentric sleeves mounted one within the other, and having each a plurality of openings therethrough, at least one of said sleeves having a predetermined taper, means for relatively rotating said sleeves, means for moving one of said sleeves longitudinally with respect to the other sleeve to adjust the space therebetween in order to regulate the homogenizing action, and means to force a mixture to be homogenized under pressure from said vat through said sleeves.

CLAUDE E. PRICE.